United States Patent
Bunel

(10) Patent No.: US 10,882,216 B2
(45) Date of Patent: Jan. 5, 2021

(54) PREFORM WITH A CONCAVE BOTTOM AND AN EVOLVING THICKNESS

(71) Applicant: SIDEL PARTICIPATIONS, Octeville-sur-mer (FR)

(72) Inventor: Christophe Bunel, Octeville-sur-Mer (FR)

(*) Notice: Subject to any disclaimer, the term of this patent is extended or adjusted under 35 U.S.C. 154(b) by 223 days.

(21) Appl. No.: 16/061,131

(22) PCT Filed: Nov. 17, 2016

(86) PCT No.: PCT/FR2016/052980
§ 371 (c)(1),
(2) Date: Jun. 11, 2018

(87) PCT Pub. No.: WO2017/103361
PCT Pub. Date: Jun. 22, 2017

(65) Prior Publication Data
US 2018/0361624 A1 Dec. 20, 2018

(30) Foreign Application Priority Data
Dec. 16, 2015 (FR) .................................. 15 62520

(51) Int. Cl.
*B29B 11/14* (2006.01)
*B29C 49/06* (2006.01)

(52) U.S. Cl.
CPC ....... *B29B 11/14* (2013.01); *B29B 2911/1402* (2013.01); *B29B 2911/1404* (2013.01);
(Continued)

(58) Field of Classification Search
CPC ........... B29B 11/14; B29B 2911/14332; B29B 2911/14486; B29B 2911/1464; B29B 2911/147; B29B 2911/14826
See application file for complete search history.

(56) References Cited

U.S. PATENT DOCUMENTS 3,966,382 A 6/1976 Edwards
4,785,948 A * 11/1988 Strassheimer ...... B29C 49/0078
215/373
(Continued)

FOREIGN PATENT DOCUMENTS

EP 2 697 024 B1 5/2015
JP S62-275710 A 11/1987
WO 2012/140343 A1 10/2012

OTHER PUBLICATIONS

Database WPI, Week 198802, Thomson Scientific, London, GB, AN 1988-011703, XP002760560.
(Continued)

*Primary Examiner* — Robert B Davis

(57) ABSTRACT

Disclosed is a preform for a plastics container, which includes: a rotationally symmetrical body about a central axis; an open neck which extends in continuation of the body from an upper end of the latter; a bottom which closes the body starting from a lower end of the latter, the bottom being rotationally symmetrical about the central axis and having a central concavity and a protruding bulge around this concavity, the bottom having a thickness E, measured from an external face, that is variable in accordance with three different criteria respectively applied to three sections of the bottom, namely a central section [0; $S_1$], an intermediate section [$S_1$; $S_2$] and a peripheral section [$S_2$; L].

18 Claims, 6 Drawing Sheets

(52) U.S. Cl.
CPC .................. *B29B 2911/147* (2013.01); *B29B 2911/14026* (2013.01); *B29B 2911/14033* (2013.01); *B29B 2911/1464* (2013.01); *B29B 2911/14332* (2015.05); *B29B 2911/14486* (2013.01); *B29B 2911/14826* (2013.01); *B29C 49/06* (2013.01)

(56) References Cited

U.S. PATENT DOCUMENTS

| | | | | |
|---|---|---|---|---|
| 4,969,563 | A | * | 11/1990 | Strassheimer ...... B29C 49/0078 215/373 |
| 2009/0078672 | A1 | * | 3/2009 | Parrinello ............ B65D 1/0284 215/383 |
| 2013/0244050 | A1 | | 9/2013 | Witz |
| 2014/0030461 | A1 | | 1/2014 | Bunel et al. |

OTHER PUBLICATIONS

International Search Report, dated Feb. 27, 2017, from corresponding PCT application No. PCT/FR2016/052980.

* cited by examiner

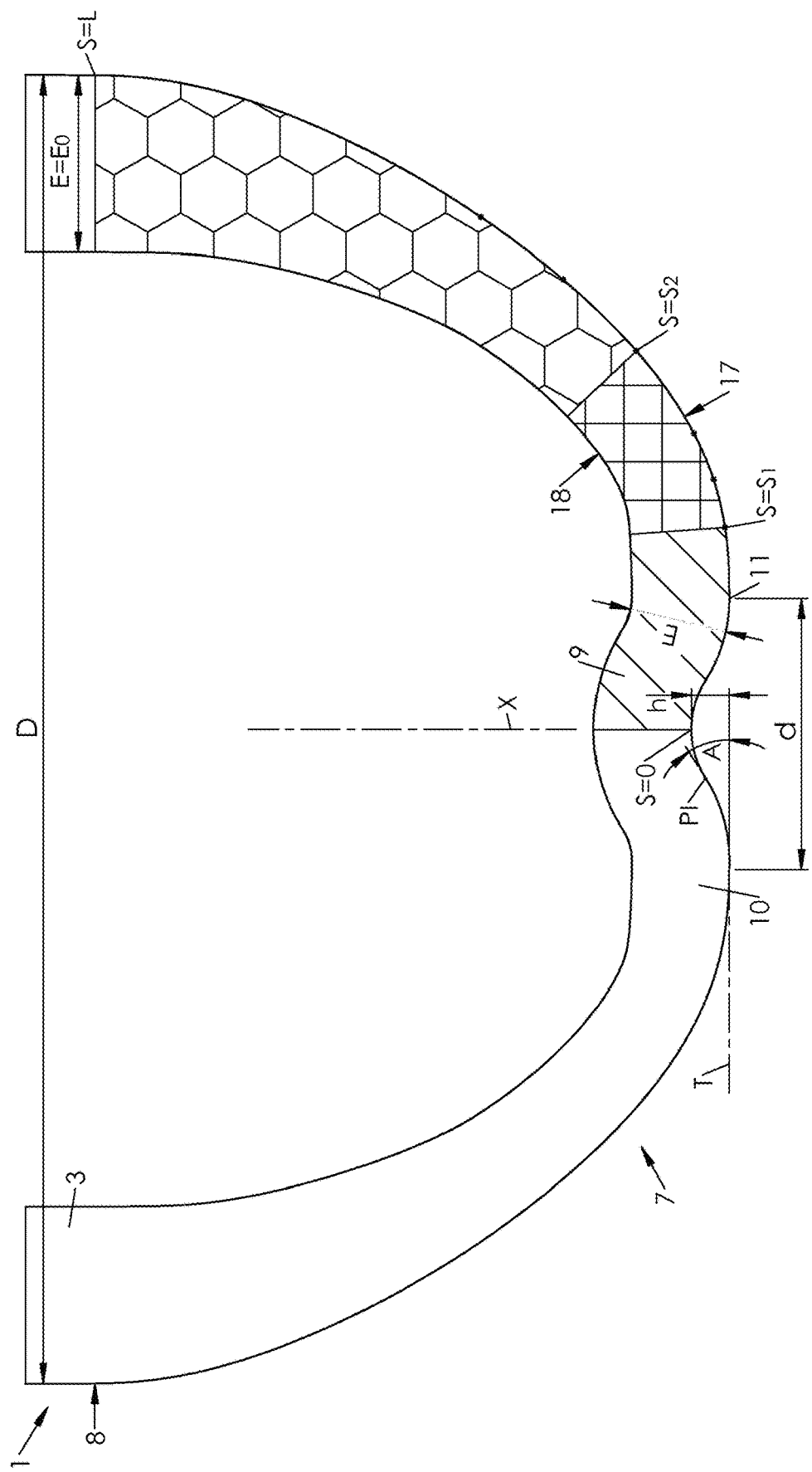

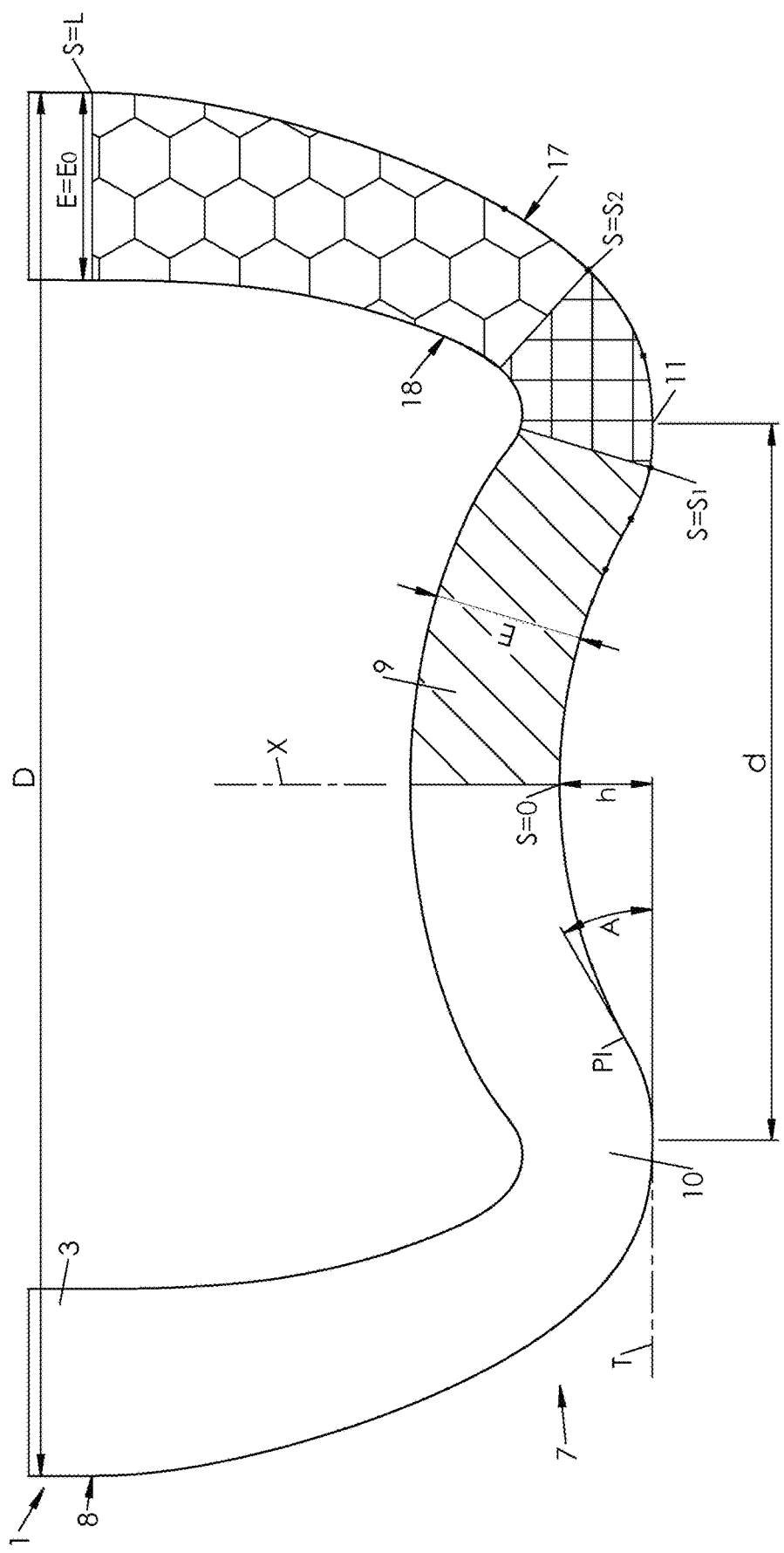

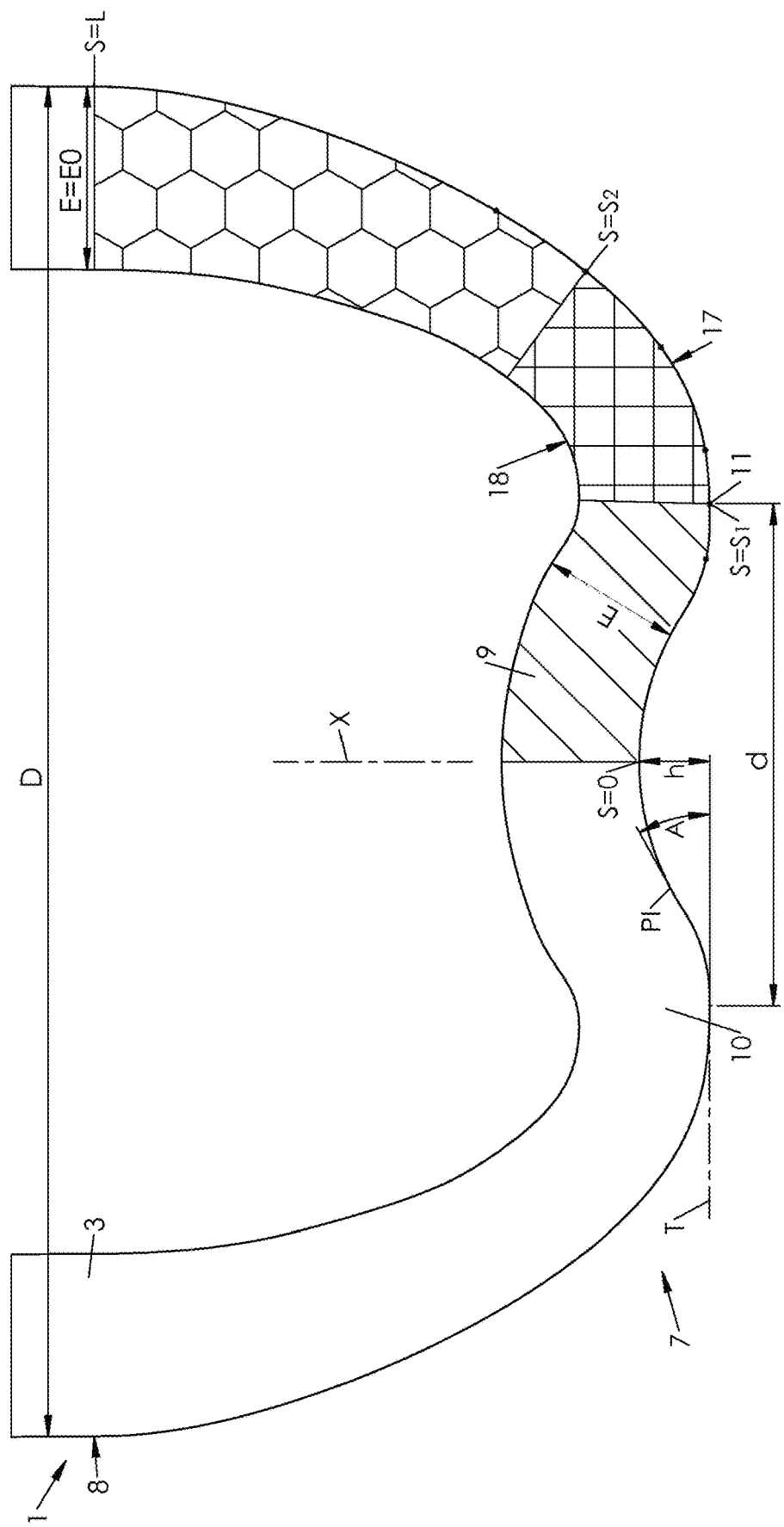

PREFORM WITH A CONCAVE BOTTOM AND AN EVOLVING THICKNESS

The invention relates to the manufacturing of containers starting from preforms made of plastic material, in particular polyethylene terephthalate (PET).

More specifically, the invention relates to a preform that is designed for forming a container by blow molding or stretch blow molding within a mold that bears the impression of the container.

A container ordinarily comprises a generally rotationally-symmetrical side wall that extends along a central axis, a neck that extends in continuation of the side wall and by which the container is designed to be filled and emptied, and a bottom that extends transversely starting from a lower end of the body and by which the container is designed to rest on a flat surface.

A preform ordinarily comprises a body of essentially cylindrical shape (designed to form the side wall of the container), an open neck that extends in continuation of the body starting from an upper end of the latter, and from which it is separated by a collar (the neck remains unchanged during the process of forming the container), as well as a bottom that closes the body at a lower end of the latter (and designed to form the bottom of the container).

Regardless of the shape of the bottom of the container that is to be formed, the vast majority of the preforms have a bottom with a shape that is convex, hemispherical or more generally bent toward the outside, cf., for example, the European patent application EP 2 697 024 (Sidel) or its U.S. equivalent US 2014/030461. However, in the vast majority thereof, the containers have a concave bottom. It is therefore understood that during forming, the material of the bottom should, starting from a convex profile, be inverted to take on a concave profile. This inversion induces stresses in the material that can generate microcracks. Such microcracks can be propagated when the container is put under pressure. Even events of rupture are noted in certain applications (this is typically the case of certain containers with petaloid bottoms, provided with alternating projecting feet and recessed valleys and designed for carbonated beverages). The risk of cracking (and rupture) is aggravated by the tendency of the market, in search of savings in material and reduction of polluting emissions, to impose a reduction in the weight (and therefore in the thickness) of preforms. This risk is also made worse by the increase in production rates (several tens of thousands of containers produced per hour and per machine), which induces a reduction in the individual manufacturing cycle time of the container. The result is a reduction in contact time of the container with the mold, and therefore a less favorable cooling of the container.

Let us add that certain plastic materials (this is in particular the case of PET, very widely used in the manufacturing of containers) have a shape memory effect, i.e., that after having been deformed plastically starting from an initial stable shape (vitreous in the case of a preform made of PET), these materials undergo, over time, internal stresses that make them move toward their initial shape.

In the case of containers, this memory effect induces undesirable deformations on the bottoms of the containers, which then become unstable and whose mechanical strength decreases, accompanying a reduction in the clearance (i.e., the distance, measured axially, between the center of the bottom and the laying plane defined by the latter).

As a first approximation, it could be imagined that it is enough to make the bottoms of the preforms concave, as illustrated in the U.S. patent application US 2013/0244050 (Husky).

If such a shape actually makes it possible to reduce the memory effect, by contrast it is unfortunately necessary to note that it is not enough to solve the cracking problem, which proves subtler than it appears. In particular, even obtained starting from preforms with concave bottoms, the petaloid bottoms are often subject to the cracking phenomenon, primarily on the inner edges of the feet, at the junction with a central arch of the bottom. It is further observed—which can partly explain this phenomenon—that this junction also forms, on the molecular level, the limit between a zone (the feet) in which the material is relatively elongated (and therefore fairly crystalline) and a zone (the center) in which the material is relatively more amorphous.

One objective is consequently to propose a preform whose geometry makes it possible to decrease the cracking risks.

For this purpose, in the first place, a preform of a container that is made of plastic material is proposed, which preform comprises:
- A rotationally-symmetrical body around a central axis,
- An open neck that extends in continuation of the body starting from an upper end of the latter, and
- A bottom that closes the body starting from a lower end of the latter, with the bottom being rotationally symmetrical around the central axis and having a central concavity and a protruding bulge around this concavity, with the bottom having a variable thickness E, measured starting from an external face, with this preform being such that, in any cutting plane that passes through the central axis, the thickness E of the bottom verifies the geometric criteria (R4.1), (R4.2) and (R4.3) below, with the following being given:
S the curvilinear abscissa measured on the external face, starting from the central axis that acts as the origin;
L the total curvilinear half-length of the bottom, measured on the external face starting from the central axis up to the lower end of the body;
$S_1$ a value of the curvilinear abscissa S such that $0.2 \cdot L \leq S_1 \leq 0.3 \cdot L$;
$S_2$ a value of the curvilinear abscissa S such that $0.4 \cdot L \leq S_2 \leq 0.6 \cdot L$;
$E_0$ the thickness of the preform at the lower end of the body;
$[0; S_1]$ a central cross-section of the bottom, defined by a curvilinear abscissa S of between the origin and $S_1$;
$[S_1; S_2]$ an intermediate cross-section of the bottom, defined by a curvilinear abscissa S of between $S_1$ and $S_2$;
$[S_2; L]$ a peripheral cross-section of the bottom, defined by a curvilinear abscissa S of between $S_2$ and L;
(R4.1) in the central cross-section $[0; S_1]$ of the bottom, the thickness E of the preform is such that:

$$0.65 \cdot E_0 \leq E \leq 0.95 \cdot E_0$$

(R4.2) in the intermediate cross-section $[S_1; S_2]$ of the bottom, the thickness E of the preform is strictly less than its value at any point of the central cross-section;
(R4.3) in the peripheral cross-section $[S_2; L]$ of the bottom, the thickness E of the preform is increasing.

It was possible to verify, during the forming of containers with petaloid bottoms starting from such preforms, a significant reduction of the cracking phenomena, in particular on the inner edges of the feet, at the junction with the central arch of the bottom.

Various additional characteristics can be provided, by themselves or in combination:

In the central cross-section $[0; S_1]$ of the bottom, the thickness E of the preform is such that:

$$0.70 \cdot E_0 \leq E \leq 0.80 \cdot E_0$$

with, preferably:

$$E \cong 0.75 \cdot E_0$$

In the intermediate cross-section $[S_1; S_2]$ of the bottom, the thickness E of the preform is such that:

$$E \cong 0.70 \cdot E_0$$

The preform also verifies the following geometric rule (R1):

$$0.2 \cdot D \leq d \leq 0.5 \cdot D \qquad (R1)$$

with, preferably:

$$d \cong 0.35 \cdot D$$

where:
d is the diameter of one end of the bottom, defined by the bulge;
D is the outer diameter of the body, measured at the junction with the bottom;
the preform also verifies the following geometric rule (R2):

$$0.02 \cdot D \leq h \leq 0.08 \cdot D \qquad (R2)$$

with, preferably:

$$h \cong 0.05 \cdot D$$

where h is the bottom clearance, measured between the center of the bottom and the end that is formed by the bulge;
The preform also verifies the following geometric rule (R3):

$$4° \leq A \leq 38° \qquad (R3)$$

with, preferably:

$$30° \leq A \leq 35°$$

where A is the angle that forms, with any transverse plane that is perpendicular to the central axis, the tangent, on the external face of the preform, at a point of inflection that is located at the junction between the central concavity and the bulge.

In the second place, a mold for the forming of a preform as presented above is proposed, with this mold comprising:
A mold body that has a side wall that bears the impression of an external face of the body of the preform and a mold bottom that bears the impression of an external face of the bottom of the preform;
A core that bears the impression of an internal face of the preform.

Other objects and advantages of the invention will become evident from the description of an embodiment, given below with reference to the accompanying drawings in which:

FIG. 4 is a detail view of the preform of FIG. 1, according to the frame IV;

FIG. 5 is a detail view of the preform of FIG. 2, according to the frame V;

FIG. 6 is a detail view of the preform of FIG. 3, according to the frame VI;

Figure 3:
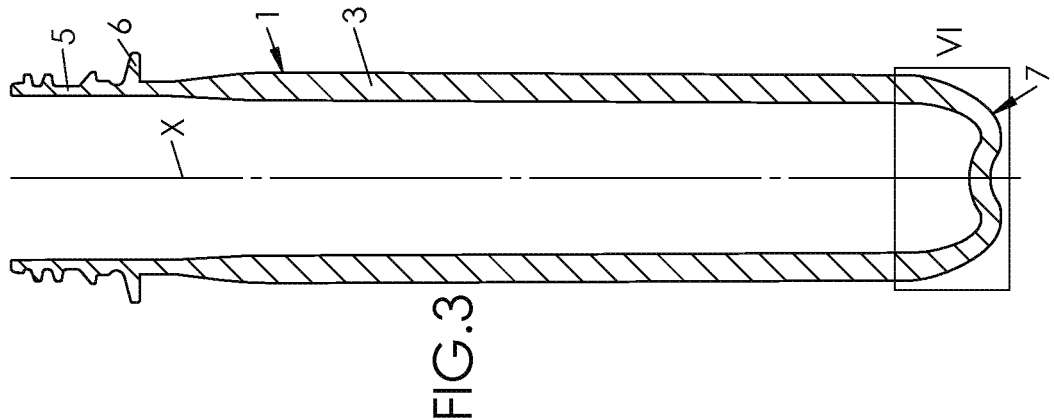
FIG. 3 is a cutaway view of a container preform, according to a third embodiment.
Figure 2:
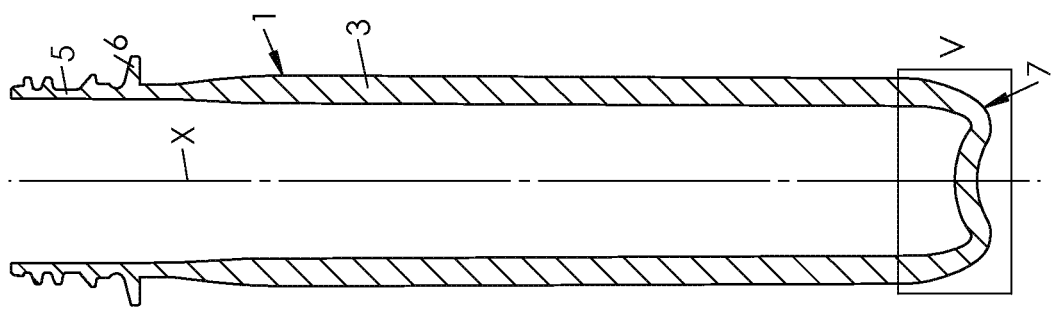
FIG. 2 is a cutaway view of a container preform, according to a second embodiment.
Figure 1:
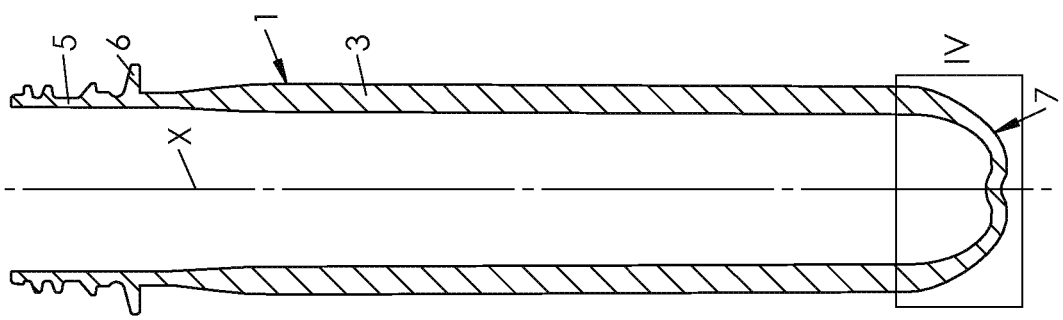
FIG. 1 is a cutaway view of a container preform, according to a first embodiment.
Figure 8:
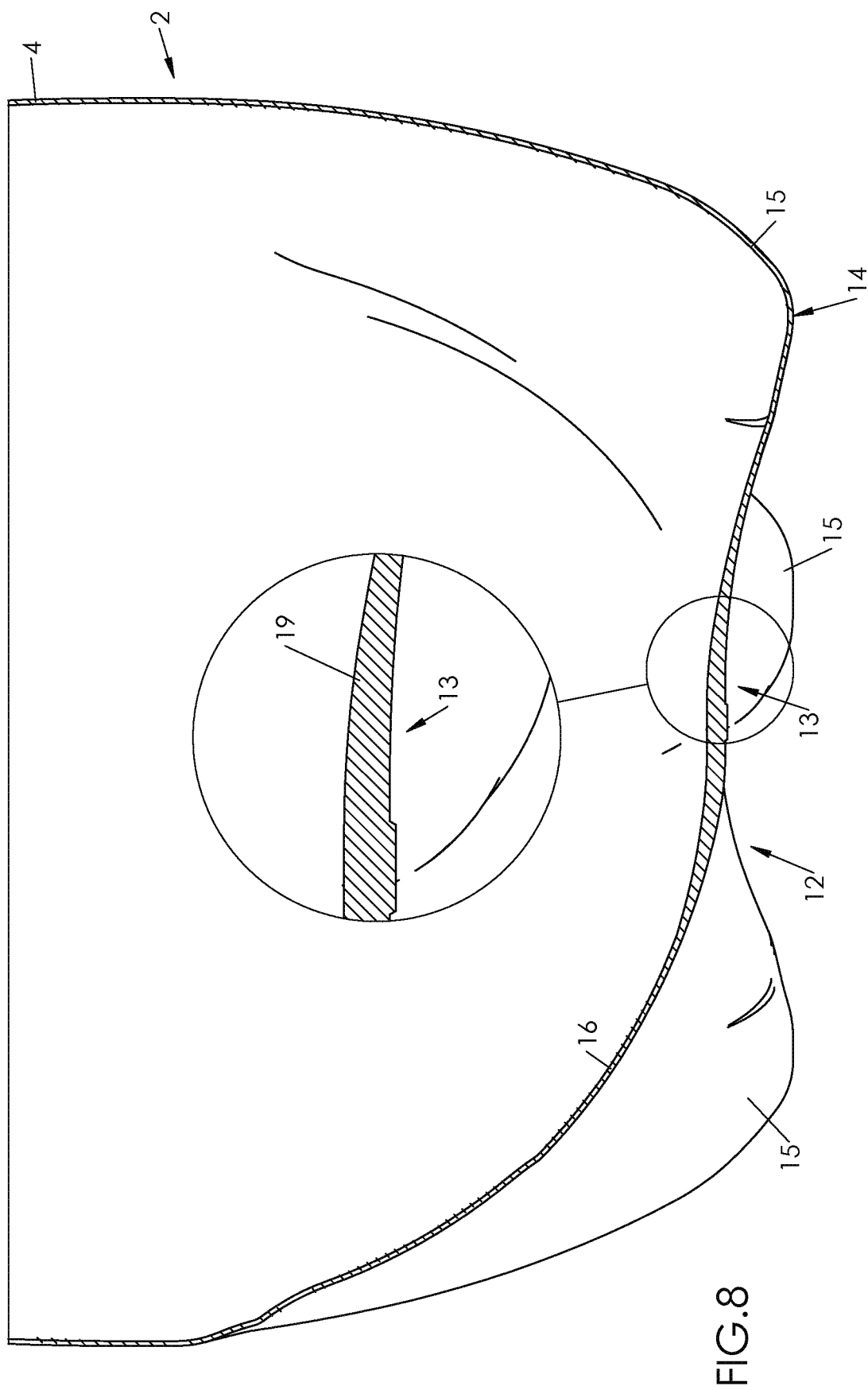
FIG. 8 is a cutaway view of the bottom of a container, of petaloid shape, formed from a preform as illustrated in FIGS. 1 to 6, and more particularly from the preform of FIGS. 3 and 6.

In each of FIGS. 1, 2 and 3, a preform 1 that is made of plastic material such as PET (polyethylene terephthalate) is shown, starting from which preform a container 2 (as illustrated in FIG. 8) is designed to be formed by blow molding or stretch blow molding. In the first place, each preform 1 comprises a body 3 that extends in a rotationally-symmetrical manner around a central axis X. According to an advantageous mode that is suitable for most applications, the body 3 is cylindrical.

The body 3 of the preform 1 is designed to form a body 4 and a shoulder (not visible) of the container 2 (partly visible in FIG. 8).

In the second place, each preform 1 comprises an open neck 5 that extends in continuation of the body 3 starting from an upper end of the latter. The neck 5 has its final shape, which it is designed to retain throughout the entire forming and life of the container 2.

The neck 5 is advantageously separated from the body 3 by a collar 6 that projects radially, by which the preform 1 (and then the container 2) is suspended (or more generally held) during various operations for conveying, for heating the preform 1, or for forming the container 2, and then, respectively, for filling, capping and labeling the latter.

In the third place, each preform 1 comprises a bottom 7 that closes the body 3 starting from a lower end 8 of the latter; i.e., the material of the bottom 7 extends starting from the lower end 8 of the body 3 (cylindrical) to rejoin the central axis X radially and thus to close the preform 1 opposite the neck 5. The bottom 7 is rotationally symmetrical around the central axis X; i.e., it is invariant in the entire longitudinal cutting plane (in other words, passing through the central axis X, corresponding to the plane of the sheet in FIGS. 1 to 6).

Below, the terms "concave" and "convex" are defined in reference to the internal volume of the preform 1. In other words, a zone is said to be concave if its concavity faces toward the outside of the preform 1 and, conversely, convex if its convexity faces toward the outside of the preform 1.

As FIGS. 1 to 6 clearly show, the bottom 7 has, in cross-section in any longitudinal cutting plane, a rounded W shape.

More specifically, the bottom 7 has a central concavity 9 and a convex bulge 10 that projects around this concavity 9, with this bulge 10 defining an annular end 11 of the preform 1 in a transverse plane T with an end that is perpendicular to the central axis X.

This shape is designed to promote the formation of a bottom 12 of the container 2 that has a concave central arch 13 and a convex peripheral seat 14. Typically, and as is illustrated in FIG. 8, the bottom 12 of the container 2 that is to be formed can be in particular of the petaloid type and comprises alternating (when considered angularly around the central axis) protruding feet 15 and valleys 16 of essentially hemispherical shape, with the feet 15 being connected, in the direction of the center, to the central arch 13.

The preform 1 has an external face 17 and an internal face 18. The bottom 7 has a thickness, denoted E, measured in any longitudinal cutting plane starting from the external face 17. In other words, at any point of the external face 17, the thickness E of the bottom (or more generally of the preform, except for the neck) is the smallest distance from this point to the internal face 18, or, which amounts to the same thing, the radius of the circle that is centered on this point and tangent to the internal face 18 at right angles to this point.

At the junction between the concavity 9 and the bulge 10 that surrounds it, the bottom 7 has, on its external face 17, in any longitudinal cutting plane, a point of inflection PI.

For the requirements for sizing the bottom, the following are noted:

D the external diameter of the body 3, measured at the junction with the bottom 7 (in other words, the overall diameter of the bottom 7);

d the diameter of the end 11, defined by the bulge 10;

h the clearance of the bottom 7, i.e., the distance, measured axially, separating the central point of the bottom 7 from the transverse plane T;

A the angle that forms, with the transverse plane T (or with any other plane that is perpendicular to the central axis X), the tangent, on the external face 17 of the preform 1, at the point of inflection PI;

S the curvilinear abscissa of the bottom 7, measured in any longitudinal cutting plane on the external face 17, starting from the central axis X that acts as the origin;

L the total curvilinear half-length of the bottom 7, measured in any longitudinal cutting plane on the external face 17 starting from the central axis X up to the lower end 11 of the body 3;

$S_1$ a value of the curvilinear abscissa S such that $0.2 \cdot L \leq S_1 \leq 0.3 \cdot L$;

$S_2$ a value of the curvilinear abscissa S such that $0.4 \cdot L \leq S_2 \leq 0.6 \cdot L$;

$E_0$ the thickness of the preform 1 at the lower end of the body 3 or, in other words, at the junction of the bottom 7 and the body 3.

In addition, also for the sizing requirements of the bottom 3, three concentric zones are distinguished on the latter, namely:

A central cross-section, defined by a curvilinear abscissa S of between the origin (S=0) and $S_1$, and that is therefore denoted $[0; S_1]$; this central cross-section is illustrated, in FIGS. 4, 5, and 6, by the hachured pattern;

An intermediate cross-section, defined by a curvilinear abscissa S of between $S_1$ and $S_2$ and that is therefore denoted $[S_1; S_2]$; this intermediate cross-section is illustrated, in FIGS. 4, 5 and 6, by the checked pattern;

A peripheral cross-section, defined by a curvilinear abscissa S of between $S_2$ and L and that is therefore denoted $[S_2; L]$; this peripheral cross-section is illustrated, in FIGS. 4, 5 and 6, by a honeycomb pattern.

In the first embodiment, illustrated in FIG. 4, $S_1$ is on the order of 20% of the total curvilinear half-length L of the bottom 7, while $S_2$ is on the order of 40% of the latter.

In the second embodiment, illustrated in FIG. 5, $S_1$ is on the order of 30% of the total curvilinear half-length L of the bottom 7, while $S_2$ is on the order of 50% of the latter.

In the third embodiment, illustrated in FIG. 6, $S_1$ is on the order of 25% of the total curvilinear half-length L of the bottom 7, while $S_2$ is on the order of 50% of the latter.

To size the bottom 7, use is made of four geometric rules: a rule of diameter, denoted R1, a rule of clearance, denoted R2, an angular rule, denoted R3, and a thickness rule, denoted R4, with the objective being, let us remember, to minimize the occurrence (and the extent) of the cracking phenomenon, not only during the formation of the bottom 12 of the container 2, primarily when the latter has a petaloid shape, but also when the blow-molding fluid of the container 2 is evacuated, while the container 2 is still warm because of the short contact time with the wall of its mold because of the increase in production rates.

Although the first three rules, R1, R2, and R3, are optional, they are nevertheless advantageous because they contribute to the achievement of the objective. The fourth rule, R4, by contrast, is imperative and essentially consists in carrying out the latter.

According to the first rule R1, the diameter d of the end 11 is linked to the overall diameter D of the bottom 7 by a relationship of proportionality in a ratio of between 0.2 (20%) and 0.5 (50%):

$$0.2 \cdot D \leq d \leq 0.5 \cdot D \qquad (R1)$$

The lower boundary of this first rule R1, or $d \cong 0.2 \cdot D$, is illustrated by the first embodiment that is shown in FIG. 4.

The upper boundary of this first rule R1, or $d \cong 0.5 \cdot D$, is illustrated by the second embodiment that is shown in FIG. 5.

An intermediate value of this first rule R1, $d \cong 0.35 \cdot D$, is illustrated by the third embodiment that is shown in FIG. 6.

According to the second rule R2, the clearance h of the bottom 7 is tied to the overall diameter D of the bottom 7 by a proportionality relationship at a ratio of between 0.02 (2%) and 0.08 (8%):

$$0.02 \cdot D \leq h \leq 0.08 \cdot D \qquad (R2)$$

In the first embodiment, illustrated in FIG. 4, the clearance h is approximately 3% of the overall diameter D of the bottom 7, or:

$$h \cong 0.03 \cdot D$$

In the second embodiment, illustrated in FIG. 5, the clearance h is approximately 7% of the overall diameter D of the bottom 7, or:

$$h \cong 0.07 \cdot D$$

In the third embodiment, illustrated in FIG. 6, the clearance h is approximately 5% of the overall diameter D of the bottom 7, or:

$$h \cong 0.05 \cdot D$$

According to the third rule R3, the angle A of the tangent at the point of inflection PI with the transverse plane T is between 4° and 38°:

$$4° \leq A \leq 38° \qquad (R3)$$

The angle A is, moreover, advantageously between 30° and 35°:

$$30° \leq A \leq 35°$$

In the first embodiment, illustrated in FIG. 4, the angle A is approximately 32°:

$$A \cong 32°$$

In the second embodiment, illustrated in FIG. 5, the angle A is approximately 30°:

$$A \cong 30°$$

In the third embodiment, illustrated in FIG. 6, the angle A is approximately 29°:

$$A \cong 29°$$

According to the fourth rule R4, the thickness E of the bottom 7 is variable based on the curvilinear abscissa S, between the origin (S=0) and the junction with the body (S=L), according to three criteria, namely a first criterion (R4.1) that is applied to the central cross-section [0; $S_1$], a second criterion (R4.2) that is applied to the intermediate cross-section [$S_1$; $S_2$], and a third criterion (R4.3) that is applied to the peripheral cross-section [$S_2$; L].

According to the first criterion (R4.1), in the central cross-section [0; $S_1$] of the bottom 7, the thickness E of the preform 1 is between 65% and 95% of the thickness $E_0$ of the preform 1 at the lower end 8 of the body 3:

$$0.65 \cdot E_0 \leq E \leq 0.95 \cdot E_0 \quad (R4.1)$$

Preferably, in the central cross-section [0; $S_1$] of the bottom 7, the thickness E of the preform 1 is even between 70% and 80% of the thickness $E_0$ of the preform 1 at the lower end 8 of the body 3:

$$0.70 \cdot E_0 \leq E \leq 0.8 \cdot E_0 \quad (R4.1)$$

According to a preferred embodiment that is illustrated in FIGS. 4, 5 and 6, in the central cross-section [0; $S_1$] of the bottom 7, the thickness E of the preform 1 is a decreasing affine function of the thickness $E_0$ of the preform 1 at the lower end 8 of the body 3, according to the following equation:

$$E = K1 \cdot E_0 - K2 \cdot S$$

where K1 and K2 are strictly positive constant real numbers.

In the first embodiment, illustrated in FIG. 4, K1 is approximately 0.56, and K2 is approximately 0.011, such that, in the central cross-section [0; $S_1$] of the bottom 7, the thickness E of the preform 1 slightly decreases, starting from the center, according to the following affine function:

$$E = 0.56 \cdot E_0 - 0.011 \cdot S$$

In this case, taking into account the weakness of the coefficient K2, it is possible to disregard the variable term and to consider the thickness E to be roughly constant, in the entire central cross-section [0; $S_1$] of the bottom 7, by being proportional to the thickness $E_0$:

$$E \cong 0.56 \cdot E_0$$

In the second embodiment, illustrated in FIG. 5, K1 is approximately 0.8, and K2 is approximately 0.043, such that in the central cross-section [0; $S_1$] of the bottom 7, the thickness E of the preform 1 slightly decreases, starting from the center, according to the following affine function:

$$E = 0.8 \cdot E_0 - 0.043 \cdot S$$

Also in this case, taking into account the weakness of the coefficient K2, it is possible to disregard the variable term and to consider the thickness E to be roughly constant, in the entire central cross-section [0; $S_1$] of the bottom 7, by being proportional to the thickness $E_0$:

$$E \cong 0.8 \cdot E_0$$

In the third embodiment, illustrated in FIG. 6, K1 is approximately 0.75, and K2 is approximately 0.026, such that in the central cross-section [0; $S_1$] of the bottom 7, the thickness E of the preform 1 slightly decreases, starting from the center, according to the following affine function:

$$E = 0.75 \cdot E_0 - 0.026 \cdot S$$

Also in this case, taking into account the weakness of the coefficient K2, it is possible to disregard the variable term and to consider the thickness E to be roughly constant, in the entire central cross-section [0; $S_1$] of the bottom 7, by being proportional to the thickness $E_0$:

$$E \cong 0.75 \cdot E_0$$

According to the second criterion (R4.2), in the intermediate cross-section [$S_1$; $S_2$] of the bottom, the thickness E of the preform 1 is strictly less than its value at any point of the central cross-section [0; $S_1$].

In addition, in the intermediate cross-section [$S_1$; $S_2$], the thickness E is preferably essentially constant, while being between 50% and 75% of the thickness $E_0$:

$$0.5 \cdot E_0 \leq E \leq 0.75 \cdot E_0$$

In the first embodiment, illustrated in FIG. 4, the thickness E is, in the intermediate cross-section [$S_1$; $S_2$], on the order of 54% of the thickness $E_0$:

$$E \cong 0.54 \cdot E_0$$

In the second embodiment, illustrated in FIG. 5, the thickness E is, in the intermediate cross-section [$S_1$; $S_2$], on the order of 72% of the thickness $E_0$:

$$E \cong 0.72 \cdot E_0$$

In the third embodiment, illustrated in FIG. 6, the thickness E is, in the intermediate cross-section [$S_1$; $S_2$], on the order of 70% of the thickness $E_0$:

$$E \cong 0.70 \cdot E_0$$

According to the third criterion (R4.3), in the peripheral cross-section [$S_2$; L] of the bottom 7, the thickness E of the preform 1 is increasing (until reaching the value $E_0$ at the lower end 8 of the body 3).

Tests carried out for the forming of petaloid bottoms (like the bottom 12 that is illustrated in FIG. 8) have demonstrated that the application of the fourth rule R4 (advantageously combined with one or the other of the first three rules R1, R2, R3 or with all of the latter) makes it possible to minimize the cracking phenomenon on an inner edge 19 of the feet 15, at the junction with the central arch 13.

A more detailed analysis shows that, unlike the known petaloid bottoms on which a bulge of material is observed at this junction, which will promote cracking (in all likelihood), the thickness of the petaloid bottom 12 that is produced with a preform 1 such as described above, and in particular a preform 1 in accordance with the third embodiment, illustrated in FIG. 6, is continuously decreasing from the central arch 13 to the feet 15, without having the above-mentioned bulges on the inner edges of the feet. It is presumed that it is this continuous decrease that minimizes the cracking phenomenon.

A mold 20 for forming a preform 1 as described above was partially shown in FIG. 7. More specifically, the illustrated mold 20 is advantageously designed for making it possible to manufacture the preform 1 that is illustrated in FIGS. 3 and 6, by simple injection of a plastic material (typically PET).

Such a mold 20 comprises, on the one hand, a mold body 21 that has a side wall 22 that bears the impression of the external face 17 of the preform 1 on the level of the body 3 and a mold bottom 23 that bears the impression of the external face 17 of the preform 1 on the level of the bottom 7, and, on the other hand, a core 24 that bears the impression of the internal face 18 of the preform 1.

The mold body 21 and the mold bottom 23 are stationary, while the core 24 can move in translation in relation to the latter to make possible the evacuation and the uncovering of the preform 1, once formed.

Figure 7:
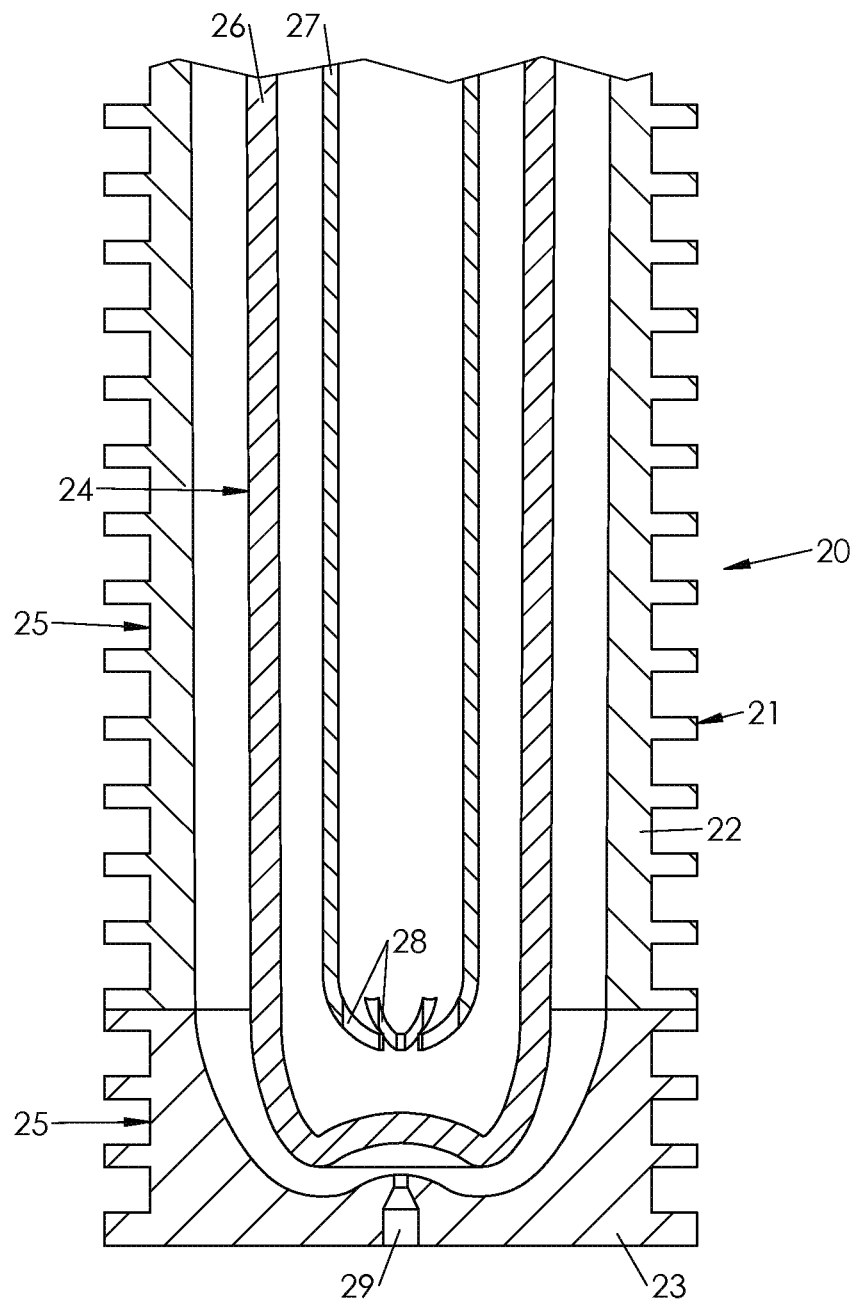
FIG. 7 is a cutaway view of a mold that makes it possible to form the preform of FIGS. 3 and 6.

As FIG. 7 shows, the side wall 22 and the mold bottom 23 are provided, on their peripheries, with grooves 25 that form, with an external shell (not shown), conduits for circulation of a refrigerant (such as water), which is designed to ensure the cooling, via its external face 17, of the preform 1 immediately after its forming.

As FIG. 7 also shows, the core 24 is provided with a hollow external envelope 26 that bears the impression of the internal face 18 of the preform 1, and a central injector 27, also hollow, provided at a lower end with scallops 28.

A refrigerant (such as water), introduced into the injector 27, passes through the scallops 28 and circulates between the injector 27 and the envelope 26 to adjust the temperature of the latter to a moderate value and thus to ensure the cooling, via its internal face 18, of the preform 1 immediately after its forming.

The material (for example, PET) is introduced in molten form, by means of a device (not shown) for injection via a hole 29 that is pierced in the center of the mold bottom 23.

As a variant, it is possible to imagine forming the preform 1 by techniques other than simple injection, in particular injection-compression.

The invention claimed is:

1. Preform (1) of a container that is made of plastic material, which preform comprises:
   A rotationally-symmetrical body (3) around a central axis (X),
   An open neck (5) that extends in continuation of the body (3) starting from an upper end of the latter, and
   A bottom (7) that closes the body (3) starting from a lower end (8) of the latter, with the bottom (7) being rotationally symmetrical around the central axis (X) and having a central concavity (9) and a bulge (10) that protrudes around this concavity (9), with the bottom (7) having a variable thickness E, measured starting from an external face (17),
   wherein, in any cutting plane that passes through the central axis (X), the thickness E of the bottom (7) verifies the geometric rules (R1), (R4.1), (R4.2) and (R4.3) below, with the following being given:
   S the curvilinear abscissa measured on the external face (17), starting from the central axis (X) that acts as the origin;
   L the total curvilinear half-length of the bottom (7), measured on the external face (17) starting from the central axis (X) up to the lower end (8) of the body (3);
   $S_1$ a value of the curvilinear abscissa S such that $0.2 \cdot L \leq S_1 \leq 0.3 \cdot L$;
   $S_2$ a value of the curvilinear abscissa S such that $0.4 \cdot L \leq S_2 \leq 0.6 \cdot L$;
   $E_0$ the thickness of the preform (1) at the lower end (8) of the body (3);
   d a diameter of one end (11) of the bottom (7), defined by the bulge (10);
   D an outer diameter of the body (3), measured at the junction with the bottom (7);
   [0; $S_1$] a central cross-section of the bottom (7), defined by a curvilinear abscissa of between the origin and $S_1$;
   [$S_1$; $S_2$] an intermediate cross-section of the bottom (7), defined by a curvilinear abscissa of between $S_1$ and $S_2$;
   [$S_2$; L] a peripheral cross-section of the bottom (7), defined by a curvilinear abscissa of between $S_2$ and L;
   (R1) the diameter d is such that:

$0.2 \cdot D \leq d \leq 0.5 \cdot D$ (R4.1) in the central cross-section [0; $S_1$] of the bottom (7), the thickness E of the preform (1) is such that:

$0.65 \cdot E_0 \leq E \leq 0.95 \cdot E_0$.

(R4.2) in the intermediate cross-section [$S_1$; $S_2$] of the bottom (7), the thickness E of the preform (1) is strictly less than its value at any point of the central cross-section [0; $S_1$];
   (R4.3) in the peripheral cross-section [$S_2$; L] of the bottom, the thickness E of the preform (1) is increasing.

2. Preform (1) according to claim 1, in which, in the central cross-section [0; $S_1$] of the bottom (7), the thickness E of the preform (1) is such that:

$0.70 \cdot E_0 \leq E \leq 0.80 \cdot E_0$.

3. Preform (1) according to claim 2, in which, in the central cross-section [0; $S_1$] of the bottom (7), the thickness E of the preform (1) is such that:

$E \cong 0.75 \cdot E_0$.

4. Preform (1) according to claim 3, in which, in the intermediate cross-section [$S_1$; $S_2$] of the bottom (7), the thickness E of the preform (1) is such that:

$E \cong 0.70 \cdot E_0$.

5. Preform (1) according to claim 1, in which:

$d \cong 0.35 \cdot D$.

6. Preform (1) according to claim 1, which also verifies the following geometric rule (R2):

$0.02 \cdot D \leq h \leq 0.08 \cdot D$ (R2)

where h is the clearance of the bottom (7), measured between the center of the bottom (7) and an end (11) that is defined by the bulge (10).

7. Preform (1) according to claim 6, in which:

$h \cong 0.05 \cdot D$.

8. Preform (1) according to claim 1, which also verifies the following geometric rule (R3):

$4° \leq A \leq 38°$ (R3)

where A is the angle that forms, with any transverse plane that is perpendicular to the central axis (X), the tangent, on the external face (17) of the perform (1), at a point of inflection (PI) that is located at the junction between the central concavity (9) and the bulge (10).

9. Preform according to claim 8, in which:

$30° \leq A \leq 35°$.

10. Mold (20) for the forming of a preform (1) according to claim 1, which comprises:
    A mold body (21) that has a side wall (22) that bears the impression of an external face of the body (3) of the preform (1) and a mold bottom (23) that bears the impression of an external face of the bottom (7) of the preform (1);
    A core (24) that bears the impression of an internal face (18) of the preform (1).

11. Preform (1) according to claim 2, which also verifies the following geometric rule (R2):

$0.02 \cdot D \leq h \leq 0.08 \cdot D$ (R2)

where h is the clearance of the bottom (7), measured between the center of the bottom (7) and an end (11) that is defined by the bulge (10).

12. Preform (1) according to claim 3, which also verifies the following geometric rule (R2):

$0.02 \cdot D \leq h \leq 0.08 \cdot D$ (R2)

where h is the clearance of the bottom (7), measured between the center of the bottom (7) and an end (11) that is defined by the bulge (10).

13. Preform (1) according to claim 4, which also verifies the following geometric rule (R2):

$$0.02 \cdot D \leq h \leq 0.08 \cdot D \quad \text{(R2)}$$

where h is the clearance of the bottom (7), measured between the center of the bottom (7) and an end (11) that is defined by the bulge (10).

14. Preform (1) according to claim 5, which also verifies the following geometric rule (R2):

$$0.02 \cdot D \leq h \leq 0.08 \cdot D \quad \text{(R2)}$$

where h is the clearance of the bottom (7), measured between the center of the bottom (7) and an end (11) that is defined by the bulge (10).

15. Preform (1) according to claim 2, which also verifies the following geometric rule (R3):

$$4° \leq A \leq 38° \quad \text{(R3)}$$

where A is the angle that forms, with any transverse plane that is perpendicular to the central axis (X), the tangent, on the external face (17) of the preform (1), at a point of inflection (PI) that is located at the junction between the central concavity (9) and the bulge (10).

16. Preform (1) according to claim 3, which also verifies the following geometric rule (R3):

$$4° \leq A \leq 38° \quad \text{(R3)}$$

where A is the angle that forms, with any transverse plane that is perpendicular to the central axis (X), the tangent, on the external face (17) of the preform (1), at a point of inflection (PI) that is located at the junction between the central concavity (9) and the bulge (10).

17. Preform (1) according to claim 4, which also verifies the following geometric rule (R3):

$$4° \leq A \leq 38° \quad \text{(R3)}$$

where A is the angle that forms, with any transverse plane that is perpendicular to the central axis (X), the tangent, on the external face (17) of the preform (1), at a point of inflection (PI) that is located at the junction between the central concavity (9) and the bulge (10).

18. Preform (1) according to claim 5, which also verifies the following geometric rule (R3):

$$4° \leq A \leq 38° \quad \text{(R3)}$$

where A is the angle that forms, with any transverse plane that is perpendicular to the central axis (X), the tangent, on the external face (17) of the preform (1), at a point of inflection (PI) that is located at the junction between the central concavity (9) and the bulge (10).

* * * * *